United States Patent [19]
Le Floch et al.

[11] 3,976,957
[45] Aug. 24, 1976

[54] METHOD OF FREQUENCY-STABILIZATION OF A LASER AND A LASER FOR CARRYING OUT SAID METHOD

[75] Inventors: Albert Le Floch; Guy Stephan, both of Rennes, France

[73] Assignee: Agence Nationale de Valorisation de la Recherche (ANVAR), Neuilly-sur-Seine, France

[22] Filed: May 9, 1975

[21] Appl. No.: 576,004

[30] Foreign Application Priority Data
May 10, 1974 France .............................. 74.16161

[52] U.S. Cl. ............................................ 331/94.5 S
[51] Int. Cl.² ............................................ H01S 3/13
[58] Field of Search ........... 331/94.5; 350/160, 147, 350/150, 151

[56] References Cited
UNITED STATES PATENTS

| | | | |
|---|---|---|---|
| 3,588,738 | 6/1971 | Goodwin | 331/94.5 S |
| 3,596,201 | 7/1971 | Chester | 331/94.5 S |
| 3,718,868 | 2/1973 | Pao et al. | 331/94.5 S |
| 3,742,382 | 6/1973 | Smith | 331/94.5 S |

*Primary Examiner*—William L. Sikes
*Attorney, Agent, or Firm*—Cameron, Kerkam, Sutton, Stowell & Stowell

[57] ABSTRACT

In a method for stabilizing the frequency of the stimulated radiation emitted by a laser, the radiation is subjected to a first rotation of its direction of polarization by applying a magnetic field to a material which exhibits the phenomenon of magnetic rotatory polarization and is placed in a two-mirror resonator. Anisotropic losses are introduced in the resonator so as to produce a second rotation of the direction of polarization, part of the radiation contained in the resonator is extracted and its direction of polarization D is measured. The direction D is held in a reference direction $D_o$ by measuring the difference between the two directions, by reducing this difference to zero and by modifying the value of the resonant frequency of the resonator.

18 Claims, 10 Drawing Figures

METHOD OF FREQUENCY-STABILIZATION OF A LASER AND A LASER FOR CARRYING OUT SAID METHOD

This invention relates to a method of frequency stabilization of a laser and to a laser for carrying out said method. The invention finds an application in many fields of physics such as spectroscopy, metrology, the separation of isotopes, the study of high-energy excited levels and so forth.

A number of methods and devices for frequency-stabilizing the radiation emitted by a laser are already known.

In the case of a gas laser of small length which oscillates in a single longitudinal mode, there are already a number of methods of stabilization which can be applied in accordance with the prior art. The first method consists in utilizing the Zeeman effect which makes it possible to split certain amplification lines into two right and left circularly polarized components by applying a magnetic field to the amplifying gas column and to make comparisons between the intensities of these two components. When the oscillation frequency of the laser occupies a position corresponding to the center of the unsplit line, the two right and left components oscillate with the same intensity. In any other position, the two components have different intensities, thus constituting a discriminant for holding the oscillation frequency at the center of the line.

In an alternative form of this method, an absorption line can be split by the same Zeeman effect and the absorptions sustained by the right and left components are compared. Reference may be made for example to the method of T.G. Polanyi and I. Tobias described in U.S. Pat. No. 3,153,557 of July 1, 1969.

In some variants, the ellipticity of polarization of the emitted light is measured instead of comparing the intensities of circular components.

Although these methods make it possible to obtain a laser having good spectral qualities, they are nevertheless subject to a disadvantage in that the laser frequency can be stabilized only at the center of the amplification line of the gas employed. Moreover, the application of a magnetic field to the active medium inevitably introduces:

non-linear effects which modify the intensity of the stimulated radiation emitted by the laser, therefore the saturation of the Doppler profile and consequently the value of rotation of the plane of polarization produced by the Zeeman effect;
circular birefringence;
circular dichroism resulting in ellipticity of the light emitted by the laser.

These three effects combine in a highly complex manner, with the result that a variation of intensity can very easily modify for example the state of polarization of the radiation emitted by the laser without being attended by any variation in the emission frequency. Moreover, the stabilization is closely related to the shape of the amplification curve of the medium which is employed.

Another known method consists in frequency-modulating the oscillation mode of the laser and in studying the modulation of the output intensity. In fact, the phase and amplitude characteristics of the laser intensity modulation are dependent on the position of the resonant mode with respect to the central frequency of the amplification line. Frequency modulation is usually obtained by producing a very slight vibration of one of the mirrors which form the cavity, thereby achieving a very slight displacement of the optical frequency of the laser oscillation. In this connection, reference may be made, for example, to the article by W. R. C. Rowley and D. C. Wilson published in issue No. 4908 of *Nature*, Nov. 23, 1963 and entitled "Wavelength stabilization of an Optical Maser". In this case also, the oscillation frequency is necessarily stabilized at the vertex of the amplification curve. This method is lacking in accuracy, partly on account of the flatness exhibited by a Gaussian curve of the type found in gas lasers. In the case of a liquid laser, the amplification profile of which can be extremely wide and of the order of a few hundred Angstrom, this method of stabilizatio is a fortiori impossible to carry into practical effect.

A more precise method consists in utilizing the so-called "Lamb dip" phenomenon, a study of which was published by W. E. Lamb in *Physical Review*, 134, No 6A, 1964, page 1429. This phenomenon is concerned with the appearance of a dip at the vertex of the curve of intensity of the radiation emitted by a laser as a function of the frequency. The presence of said dip can be turned to useful account for frequency stabilization at this point. This method, however, is valid only in the case of short, single-mode gas lasers and does not apply to either solid or liquid lasers.

A significant improvement in this method consists in making profitable use of the so-called "magnetic Lamb dip" phenomenon which was disclosed in French Pat. No. 2,070,978 granted on Aug. 23, 1971 in respect of "A method of frequency-stabilization of a single-mode gas laser and a gas laser for the application of said method". Although applicable to single-mode gas lasers, this method has been generally extended to long lasers which have previously been set for single-frequency oscillation by a known method of spectral selection. Reference can be made in this connection to French patent application Ser. No. 72 14213 in respect of "A method of frequency and intensity stabilization of the radiation emitted by a high-power gas laser and a gas laser for the application of said method".

The method just mentioned is well-suited to gas lasers but is not applicable to the dye lasers which do not usually exhibit the magnetic Lamb dip phenomenon. In addition, the method further entails the application of a magnetic field to the amplifying medium and this leads to the difficulties which have already been mentioned.

The precise aim of the present invention is to provide a method of frequency-stabilization of the stimulated radiation emitted by a laser, which is not subject to any of the disadvantages of all these known methods and which is particularly well suited to frequency-stabilization of lasers having a very wide amplification band and in particular to the dye lasers.

One of the essential features of the method according to the invention which distinguishes this latter from known methods lies in the fact that no magnetic field is applied to the amplifying medium, thus avoiding the phenomena of circular dichroism, of ellipticity of the emergent light and of non-linear effects which modify the saturation of the amplification profiles.

In accordance with another essential feature of the invention, the method is based on the rotation of the linear polarization of the stimulated radiation under the action of the magnetic rotatory polarization phenomenon or Faraday effect which is usually attended by frequency dispersion. As a consequence of this original mode of operation, the frequency stabilization is carried out solely by producing action on the laser resonator without involving the nature and characteristics of the amplification profile of the active medium which is employed.

The method according to the invention is therefore applicable to all lasers whether they have a narrow amplification band or not.

In more precise terms, the present invention is directed to a method of frequency-stabilization of the stimulated radiation emitted by a laser constituted by an amplifying medium placed within a resonator formed by two mirrors which consists in operating a mode selector in order to select a single mode from all the longitudinal modes which are capable of oscillating, and which is distinguished by the fact that:

said radiation is subjected within a resonator to a first rotation of its direction of polarization by placing within said resonator a material which exhibits the magnetic rotatory polarization phenomenon and by applying a magnetic field thereto, anisotropic losses are introduced into the resonator and a second rotation of the direction of polarization of said radiation is thus caused to appear, part of the radiation contained in the resonator is extracted therefrom at any predetermined point, a measurement is taken of the direction D of polarization of said extracted radiation which is a function of said point, said direction D is held to a reference direction $D_0$ by measuring the difference between the directions D and $D_0$ and reducing said difference to zero by modifying the value of the resonant frequency of the resonator which is associated with the amplifying medium.

In a first variant, the two resonators can be combined in a single unit. In another variant, provision is made for two resonators, namely an active resonator which contains the amplifying medium and gives rise to the stimulated radiation and a passive resonator which permits frequency stabilization.

In a advantageous alternative embodiment of the invention, in order to control the direction D of polarization in dependence on said reference direction $D_0$, the amplitude of the extracted radiation component at right angles to $D_0$ is detected and said component is adjusted to zero.

In one advantageous embodiment, the applied magnetic field is a constant magnetic field on which is superimposed an alternating magnetic field of small amplitude, the direction control being carried out by means of a detection which is synchronous with said alternating field.

Since the frequency is stabilized about a value which is dependent on the steady magnetic field applied to the material which exhibits the magnetic rotatory polarization phenomenon, it is possible in accordance with the invention to adjust the value of said frequency by producing action on the amplitude of said magnetic field. There is accordingly obtained at the same time a method of regulating said emission frequency, the application of which is particularly well suited to tunable dye lasers.

The invention is further directed to a laser which serves to carry out the method hereinabove defined and essentially comprises:

a Faraday rotator placed on the axis of the resonator between the amplifying medium and any one of the mirrors and constituted by a material which exhibits the magnetic rotatory polarization phenomenon, means for applying a magnetic field to said material, an optical system which is placed within said resonator and exhibits anisotropic losses in respect of said radiation, means for extracting from the resonator a part of the radiation contained therein, means for measuring the direction D of polarization of said extracted radiation, means for controlling said direction D in dependence on a reference direction $D_0$ and constituted by a control loop comprising means for measuring the difference between the directions D and $D_0$, means for generating an error signal from the measurement of said difference, means for amplifying said error signal and means controlled by said amplified error signal for modifying the resonant frequency of the resonator.

In accordance with an embodiment which offers an advantage on account of its simplicity, the optical system having anisotropic losses is constituted by at least one plate of transparent material having parallel faces and inclined to the axis of the resonator.

In accordance with a preferred embodiment, the means for measuring the direction D of polarization of the radiation extracted from the cavity comprise an analyzer whose direction is displaced by 90° with respect to the reference direction $D_0$ and a photoelectric detector which receives the extracted radiation after said radiation has passed through said analyzer.

In accordance with another preferred embodiment of the invention, the means for producing a magnetic field within the material of the Faraday rotator comprise a solenoid supplied by a first variable direct-current generator and by a second alternating-current generator. The means for generating the error signal are accordingly constituted by a synchronous detector which receives the electrical signal delivered by the photodetector and an alternating-current reference signal derived from said second alternating-current generator.

The properties and advantages of the invention will in any case become more readily apparent from the following description of exemplified embodiments which are given by way of explanation without any limitation being implied, reference being had to the accompanying drawings, wherein.

In order to gain a clear understanding of the characteristic features and advantages of the invention, it will not be inappropriate to give a general outline of the scientific field to which the invention applies.

The well-known theory of W. E. Lamb which has already been mentioned and is commonly employed to describe a laser is a scalar theory in which the resonator losses are assumed to be distributed along the principal axis of the laser and appear as a property of the active medium. This is only a first approximation in the case of lasers having localized anisotropies such as Brewster windows, for example.

This scalar theory has been extended to the study of lasers subjected to a magnetic field in the case of isotropic or weakly anisotropic lasers. In accordance with this theory, the electric field of the radiation can be represented by a single vector at any point of the laser and this vector is the same along the entire length of the resonator.

In an article published in the *Physical Review* 178, 1969, page 585, H. Greenstein explained the application of the method known as the condition of resonance and proposed a vector theory which takes into account the localization of losses. This author has demonstrated that the two theories, namely the scalar and vector theories, produced different results in the case of a Zeeman laser since the Lamb scalar theory is satisfied only at low values of anisotropy. This vector theory was discussed further by A. Le Floch and R. Le Naour in the *Physical Review* A. 4, No. 1, 1971, page 290 in the case of a resonator of very general type. Reference can also be made in this connection to the article by A. Le Floch and G. Stephan published in the *Physical Review*, volume 6, No. 2, August 1972, page 845. These authors have shown that there exist at each point of the gas column two distinct electric field vectors corresponding to two traveling waves which constitute a stationary mode. This property results from the non-reciprocal character of the Faraday rotation.

The present invention carries this vectorial laser design into practical effect and derives advantage from the existence of a relation between the orientation of the field and the Faraday rotation to which this latter is subjected.

The relationship just mentioned can be explained in greater detail with reference to FIGS. 1 and 2 which relate to a laser comprising a Faraday rotator and an anisotropic optical system.

Figure 1:
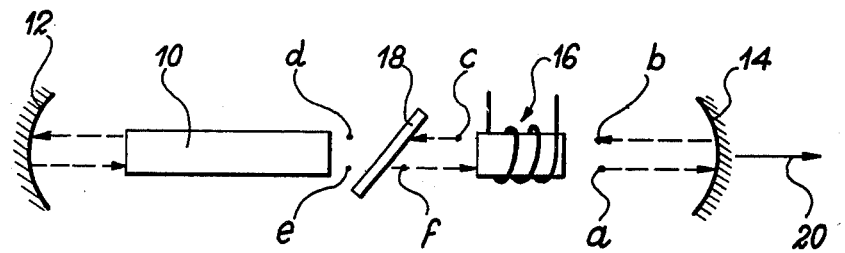
FIG. 1 is a diagram of a laser comprising a Faraday rotator and a system having anisotropic losses.

The laser which is illustrated in FIG. 1 comprises an amplifying medium 10 placed within a resonator formed by two mirrors 12 and 14; there are mounted between the amplifying medium 10 and the mirror 14 a Faraday rotator 16 and an optical system 18 having anisotropic losses which, in the particular case of FIG. 1, is constituted by a transparent plate inclined to the axis of the laser.

Figure 2:
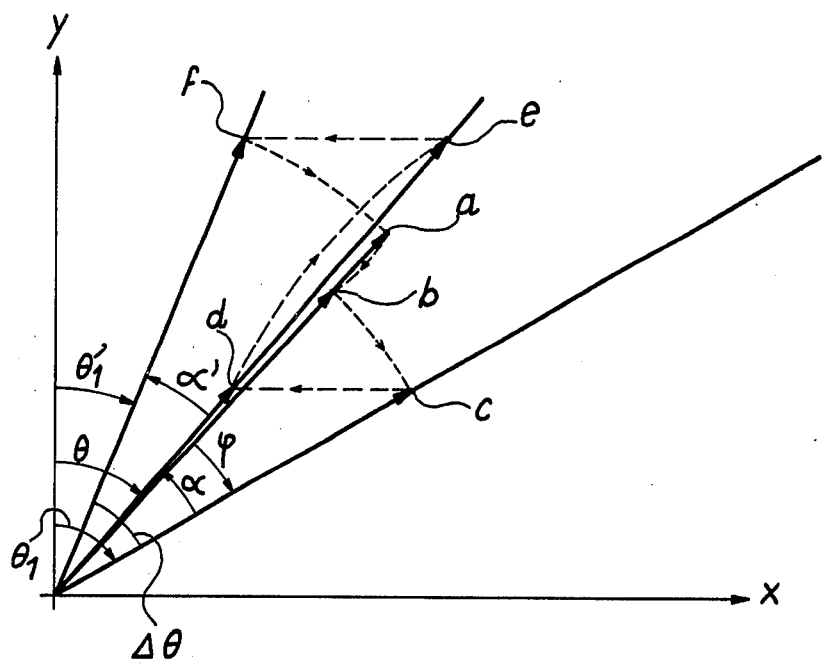
FIG. 2 is a diagram illustrating the progressive variation in the direction of polarization along the resonator of a laser of the type shown in FIG. 1.

In accordance with the conclusions which arise from the vector theory of the laser, the progressive variation of the light vector along the resonator is as illustrated in FIG. 2. This figure is a representation in amplitude and in direction of said light vector in a transverse section plane of the resonator, the axis Y being located in the plane of incidence of the plate 18.

Consideration is given to a situation at the outset in which the light vector at the point $a$ attached to the ray travels towards the mirror 14. This vector makes an angle $\theta$ with the axis Y. After reflection from the mirror 14, the amplitude of the light radiation at $b$ has decreased to a slight extent but the orientation has remained the same. The light vector then passes through the Faraday rotator and is subjected within this latter to a rotation whose amplitude is dependent on the magnetic field applied and on the characteristics of the material employed in accordance with the well-known laws of the magnetic rotatory polarization phenomenon. At the exit $c$ of the Faraday rotator, the light vector has rotated through an angle $\mu$; said vector makes an angle $\theta_1$ with the axis Y.

The radiation then passes through the anisotropic optical system constituted by the tilted plate. It is known that the traversal of an anisotropic system takes place differently in the case of the vibration located in the plane of incidence and in the case of the vibration which is perpendicular to said plane. The laws which govern this phenomenon are those of Fresnel. It is known in particular that the passage of polarized light through a tilted plate having parallel faces causes rotation of the plane of polarization and brings the vibration closer to the plane of incidence by an amount which is dependent on the angle which the vibration makes with the plane of incidence. Within the resonator, the light vector therefore rotates from the position which it occupies at the point $c$ through an angle $\alpha$ which is dependent on the angle $\theta_1$ made with the axis Y by the direction of polarization of the light vector at $c$. The light radiation is then amplified within the active medium 10 without rotation of its plane of polarization, then reflected from the mirror 12 which is assumed to be isotropic, then again amplified within the medium 10; the electric field vector at $e$ and the vector at $d$ are therefore colinear.

The light vector then undergoes a further rotation through an angle $\alpha'$ as it passes through the anisotropic plate 18 and thus comes closer to the axis Y. Starting from this limiting orientation which makes an angle $\theta'_1$ with the axis Y, the direction of polarization undergoes a further Faraday rotation through an angle $\mu$ as it passes through the rotator 16. The condition of resonance makes it necessary to ensure that the vector obtained after this last rotation coincides with the initial vector at $a$. In consequence, the angle $\theta 1$ made by the direction of polarization at the point $a$ with the plane of incidence or, equivalently, the angle $\theta'_1$ between the direction of polarization at the point $f$ and the same plane, must be such that the rotation of the plane of polarization resulting from the anisotropic character of the losses introduced into the resonator compensates for the Faraday rotation introduced by the rotator.

If $\theta$ designates the mean value between $\theta_1$ and $\theta'_1$, which therefore represents the angle made by the electric field vector at $a$ (or at $b$) with respect to the plane of incidence of the plate 18, a precise study made by the present inventors shows that the condition of resonance imposes the following value on the angle $\theta$:

$$\sin(2\theta) = 1/\epsilon \cdot \sin(2\mu)$$

where $\mu$ is the single-pass Faraday rotation, $\epsilon$ characterizes the magnitude of the anisotropy and is equal to:

$$\xi = \frac{T_r^2 - T_u^2}{T_r^2 + T_u^2}$$

where $T_r$ and $T_u$ are respectively the coefficients of transmission of the plate in the planes which are respectively perpendicular and parallel to the plane of incidence. These coefficients are given by the Fresnel formulae:

$$T_r = \frac{\sin 2i \cdot \sin 2r}{\sin^2(i+r)}$$

$$T_u = \frac{\sin 2i \cdot \sin 2r}{\sin^2(i+r)\cos^2(i-r)}$$

where $i$ is the angle of incidence and $r$ is the angle of refraction defined by $\sin i = n \sin r$, where $n$ is the refractive index of the tilted plate.

It is observed that the light vector remains parallel to a given direction as it follows a path from the point $a$ to the point $b$ through the mirror 14. A vector of this type is designated by the inventors as a "Lamb vector" since the vector theory coincides with the scalar theory in this portion of the resonator.

The radiation contained in the resonator can be extracted through the mirror 14 which is made semi-transparent, thus giving rise to the radiation 20. This radiation 20 is not subjected to any rotation as it passes through the isotropic mirror 14 but only to a reduction of amplitude; said radiation therefore has the same direction of polarization as the light vector at the points $a$ or $b$. The output vector is therefore in this case a Lamb vector which is displaced by the angle $\theta$ defined earlier with respect to the plane of incidence.

The formulae given in the foregoing therefore make it possible to define the relationship between the singlepass Faraday rotation $\mu$ and the orientation $\theta$ of the light vector within the resonator.

Having now indicated in broad outline the results achieved by the vector theory of an anisotropic laser comprising a Faraday rotator and in particular the relationship between Faraday rotation and direction of polarization, the characteristic features of the invention will be described in greater detail hereinafter with reference to FIG. 3.

The laser whose emission is to be frequency-stabilized comprises in the conventional manner an amplifying medium 22 placed in a resonator constituted by a mirror 24 and a mirror 26 which are both isotropic. The laser which is thus formed has a length such that a plurality of longitudinal modes are capable of oscillating. There is accordingly placed in the resonator a longitudinal mode selector 28 constituted in known manner by a Fabry-Perot etalon, for example. For further information on this spectral selection technique, reference can be made for example to the article by J. D. Curie entitled "High-power single-mode helium-neon laser" and published in *Applied Optics*, Vol. 8, No. 5, May 1969 and to the article by P. W. Smith published in the I.E.E.E. Journal of Quantum Electronics, Vol. QE2, No. 9, September 1966, page 666.

In accordance with an original feature of the invention, there is additionally placed within the resonator a Faraday rotator constituted by a material 30 which exhibits the magnetic rotatory polarization phenomenon and is placed within a solenoid 32 supplied from an electric current source 34; provision is also made within the resonator for an optical system 36 which exhibits anisotropic losses in respect of the stimulated radiation. By way of example, this system can be constituted by a transparent plate which is inclined to the axis of the resonator. Provision is made for means whereby a part of the radiation contained in the resonator can be extracted from this latter. Said means can consist of a plate 38 which is inclined at a small angle to the axis of the resonator and gives rise to two reflected rays 40 and 41 which pass out of the resonator. The direction D of polarization of the ray 40 makes an angle $\theta$ with the plane of incidence of the tilted plate 36. This direction is measured by the means 42 which are capable of producing action on the laser resonator in order to modify its frequency as will be explained in detail hereinafter in order to control the direction D in dependence on a reference direction $D_0$.

If control of the direction D of polarization is carried out on the beam 41 and not on the beam 40, the means 42 must be placed at 42'. it is also possible to extract the radiation from the resonator through the mirror 26, thus giving rise to the ray 43. In this case, the means for measuring and controlling the direction D must be placed at 42''.

Figure 3:
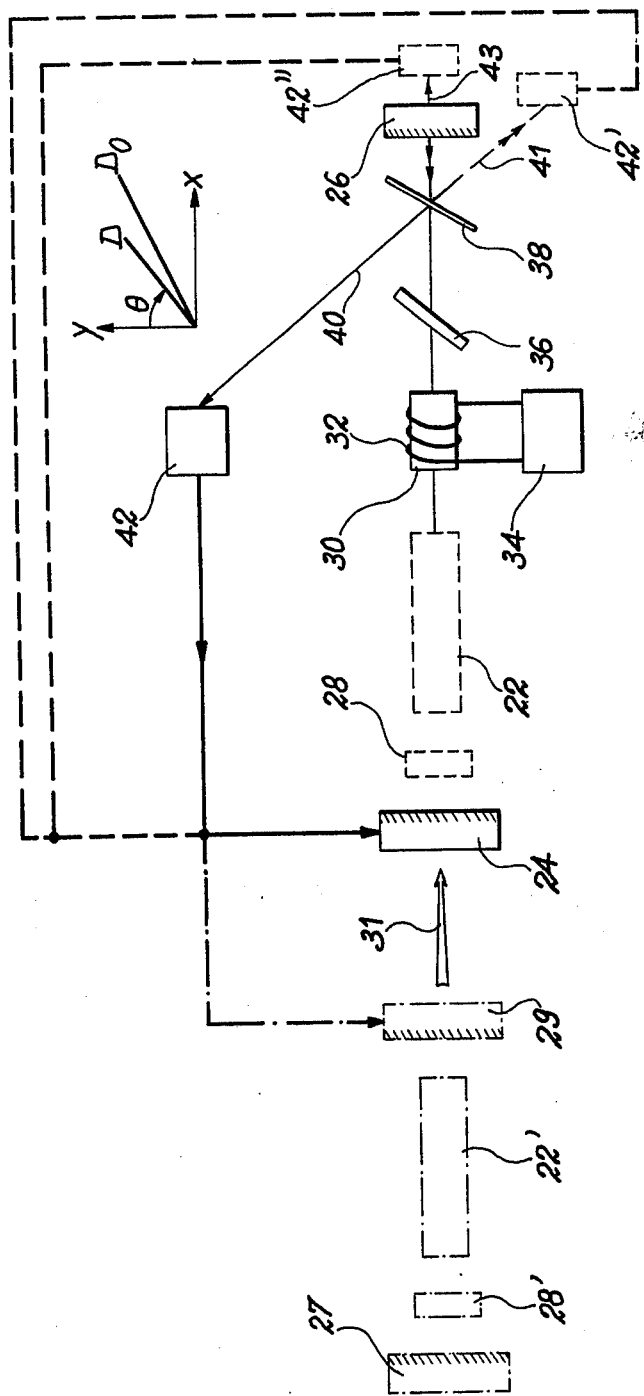
FIG. 3 is a schematic diagram of the laser in accordance with the invention.

Taking the foregoing explanations into account, the principle of operation of the laser shown in FIG. 3 is as follows: the laser is capable of oscillating only in respect of a frequency such that the Faraday rotation in the material 30 is exactly compensated by the rotation which results from the anisotropy of the plate 36. Since the rotation just mentioned is dependent on the direction of polarization of the radiation, this direction is established in such a manner as to ensure that said compensation takes place. Since the Faraday rotation depends on the frequency of the radiation, a well-determined direction of polarization consequently corresponds to every value of frequency and conversely. This makes it possible to utilize the direction D of polarization of the radiation extracted at any point as discriminant for the purpose of controlling the frequency.

The vector theory which was outlined earlier shows that the angle of orientation $\theta$ of the output vector (or Lamb vector) with respect to the plane of incidence has a maximum value of 45°. When the magnetic field applied to the rotator produces a Faraday rotation which the anisotropy is incapable of compensating, the laser polarization is no longer linear and becomes elliptical. The value of the magnetic field beyond which the polarization is no longer linear is known as the critical field. In the method and the device according to the invention, it is therefore always postulated that the applied magnetic field is of lower strength than the critical field. A means for counterbalancing an excessive Faraday rotation by producing another Faraday rotation in the opposite direction will in any case be described hereinafter.

Figure 4:
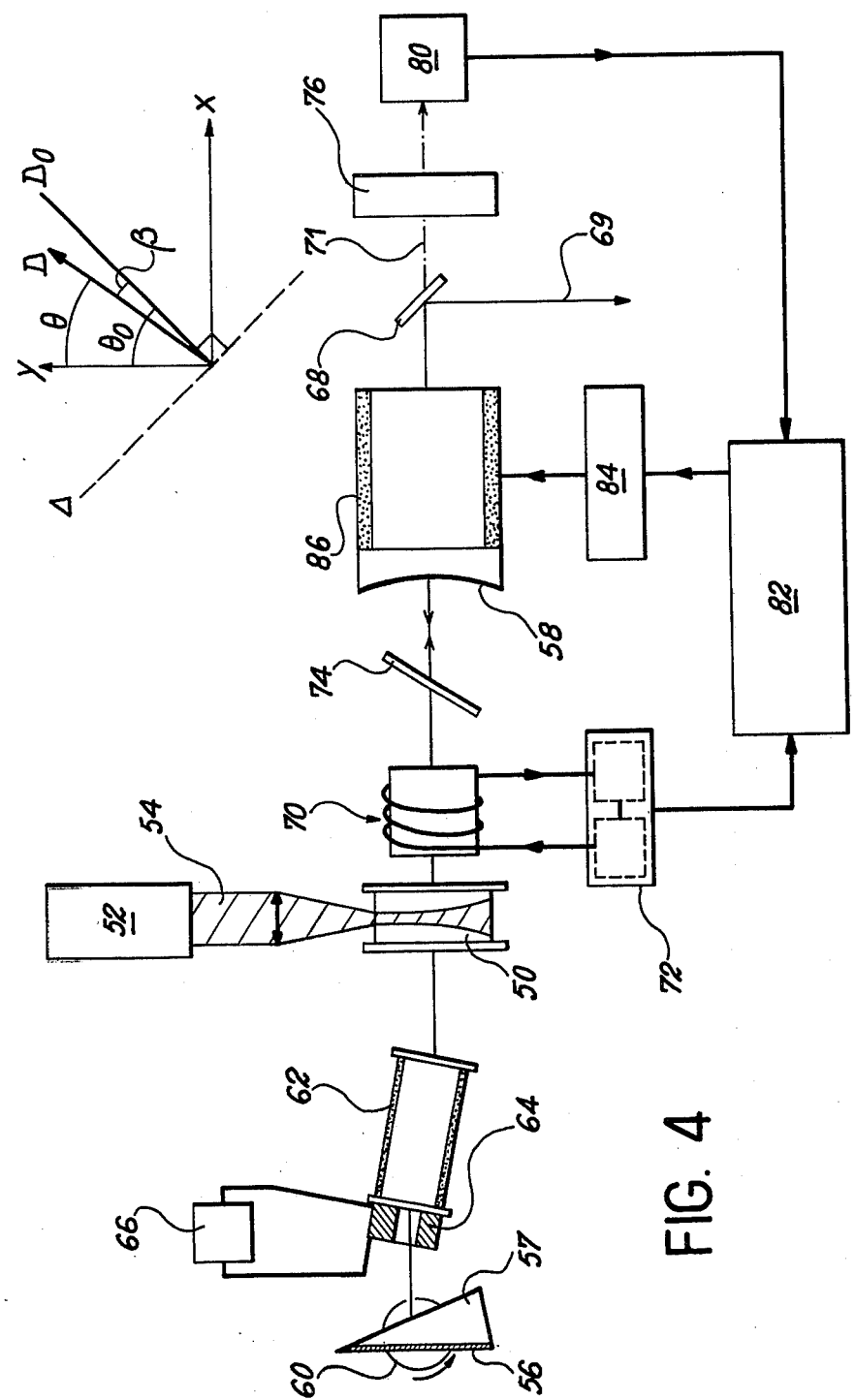
FIG. 4 is a detailed diagram of a frequency-stabilized dye laser in accordance with the invention.

FIG. 4 is a more detailed diagram than that of FIG. 3 and conforms more closely to actual practice. This diagram makes it possible in particular to define the control loop which is employed. The figure corresponds to the particular case of a dye laser since, as mentioned earlier, the method and the device according to the invention are particularly well suited to this type of laser in which methods of the prior art have proved as a general rule to be impracticable.

In FIG. 4, the dye laser comprises in conventional manner a vessel 50 filled with a suitable liquid such as a solution of rhodamine in ethanol, for example, and optically excited by means consisting for example of a continuously operating laser 52, especially of the ionized argon type; this laser emits a pumping radiation 54 which is focused within the vessel 50. The resonator comprises a mirror 56 placed behind a prism 57 which can be fitted with means 60 for producing rotational motion and a mirror 58. The device for selecting longitudinal modes is constituted by a Fabry-Perot etalon 62 mounted on a piezoelectric support 64 which is supplied by a circuit 66.

In accordance with the invention, there are placed within the resonator a Faraday rotator 70 and a anisotropic system such as a transparent plate 74 of silica, for example. The Faraday rotator is excited by means of a current source 72 which makes it possible to produce within said rotator a magnetic field formed by the superposition of a constant field of amplitude $H_0$ and of an alternating field of amplitude $H_1$ which is small in comparison with $H_0$. The light radiation which passes through the mirror 58 impinges upon a reflecting mirror 68, is then reflected from said mirror and gives rise to the light beam 69 which constitutes the laser utilization beam. The portion 71 of the radiation which passes through the mirror 68 first encounters an analyzer 76 then a photodetector 80.

If $D_0$ is the reference direction on which the direction D of polarization of the radiation 71 is to be made dependent, the analyzer 76 is so arranged as to ensure that its direction $\Delta$ is crossed with respect to the direction $D_0$. Under these conditions, the photodetector 80 receives the component of the field which is perpendicular to $D_0$. The signal delivered by the photodetector 80 is fed into a synchronous detector 82 to which is also applied a reference signal derived from the alternating-current source contained within the generator 72. The synchronous detector delivers a direct-current signal which is amplified within the circuit 84; the amplified signal controls a piezoelectric ceramic crystal 86 which is bonded to the mirror 58, thus making it possible to modify the length of the resonator and therefore the resonant frequency.

Figure 5:
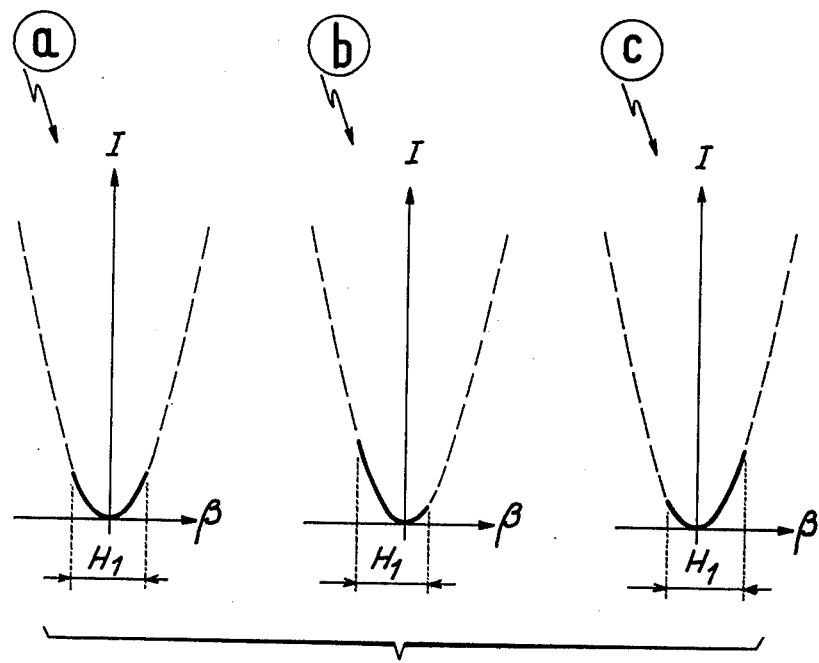
FIG. 5 represents three diagrams which serve to explain the principle of control of the direction of polarization in dependence on a reference direction.

The operation of the control loop which is constituted by the detector 80, the synchronous detector 82, the direct-current amplifier 84 and the piezoelectric support 86 can be described with reference to FIG. 5.

In FIGS. 5a, 5b and 5c, the light intensity I which is transmitted through the analyzer 76 is plotted as ordinates as a function of the angular deviation $\beta$ of D with respect to $D_0$; when the angle $\beta$ between the directions D and $D_0$ is zero, the intensity I is zero. Since the applied magnetic field within the Faraday rotator 70 results from the superposition of a constant field of amplitude $H_0$ and of an alternating field of amplitude $H_1$, this alternating component has the effect of causing the direction of polarization to oscillate about the mean value determined by the amplitude $H_0$.

In the case of FIG. 5a, it is postulated that the radiation frequency $\nu$ is equal to the stabilization frequency $\nu_0$. In this case, the direction D therefore coincides with $D_0$. The transmitted intensity then varies symmetrically with respect to zero under the action of the alternating component $H_1$ of the magnetic field, which corresponds to the solid-line portion of the curve shown.

If the radiation frequency $\nu$ is no longer exactly equal to the desired frequency $\nu_0$, the angle $\theta$ made by the direction D with the plane of incidence is no longer exactly equal to the angle $\theta_0$ relative to the reference direction $D_0$. Two cases can arise: in the first case illustrated in FIG. 5b, the frequency $\nu$ is lower than $V_0$. As a rule, the Faraday rotation in respect of the frequency $\nu$ is therefore smaller than the rotation in respect of $\nu_0$ and the variations in intensity produced by the alternating component of the magnetic field are displaced off-center with respect to the zero value towards the negative values of $\beta$. At the exit of the synchronous detector 82, there is then observed a negative direct-current signal which, after having been amplified by the circuit 84, corrects the length of the cavity in the appropriate direction by means of the piezoelectric support 86, thus restoring the frequency $\nu$ to the value $\nu_0$ and tending to reproduce the case illustrated in FIG. 5a. If the frequency $\nu$ has exceeded the value $\nu_0$, the Faraday rotation increases and the modulation of the light intensity resulting from the presence of the alternating component $H_1$ take place as indicated in FIG. 5c. In this case, the signal at the output of the synchronous detector is positive and modifies the length of the cavity in the opposite direction, thus again bringing back the frequency $\nu$ towards $\nu_0$.

Thus in accordance with the invention, the laser is stabilized on a frequency $\nu_0$ such that for a fixed value of $H_0$, crossed polarization with the exit polarizer is obtained. The following additional advantage is achieved by this method of stabilization: in order to displace the stabilized frequency $\nu_0$, it is only necessary to vary the amplitude of the constant-field component $H_0$ or to rotate the polarizer with a fixed value $H_0$. The range of adjustment which can thus be obtained depends partly on the Faraday rotator which is chosen and on the value of anisotropy.

By way of example, the material selected for the Faraday rotator can be any one of the following:

- a solid such as, for example, the glass designated by the trade name Schott, type SFSb and having a Verdet constant which varies between 0.13''/gauss/cm at 5000 A and 0.07'/gauss/cm at 7000 A. In the case of an anisotropy corresponding to a silica plate inclined at an angle of 35° and in the case of a field of approximately 100 gauss, a value in the vicinity of 6000 A is obtained with a crystal having a length of 2 cm. It is also possible to employ a suitably cut crystal of YIG. In the case of this ferrimagnetic substance, the Verdet constant is of the order of 0.075°/gauss/cm in the linear portion of the curve of the Faraday rotation as a function of the applied magnetic field;
- a liquid contained in a vessel;
- a vapor such as sodium vapor, for example, which exhibits considerable variations in Faraday rotation near the absorption lines $D_1$ and $D_2$ over small intervals. If the frequency range in which it is desired to displace the frequency decreases, the stabilization increases for the same variation of the Faraday rotation.

Figure 6:
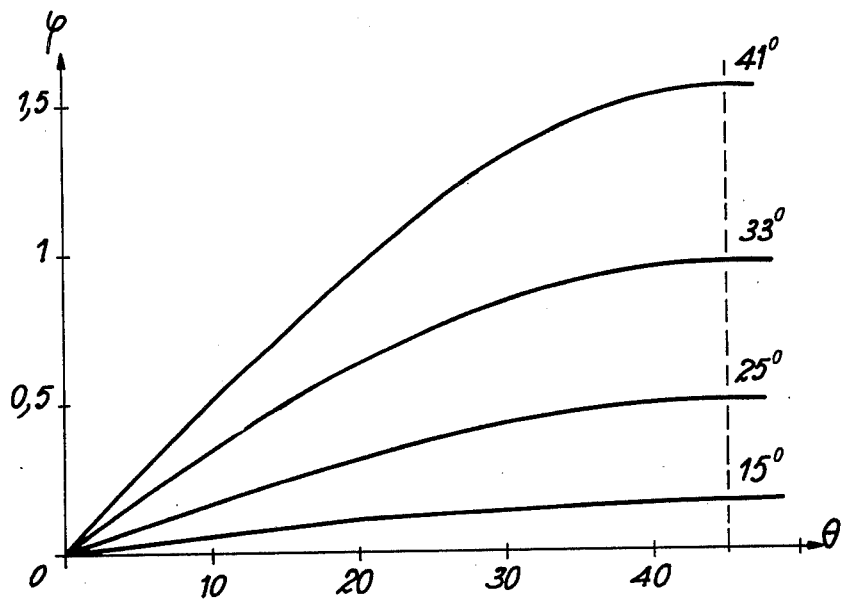
FIG. 6 represents experimental measurements in which the single-pass Faraday rotation is plotted as a function of the rotation of the output polarization in the case of different values of anisotropy.

In order to gain a clearer conception of the performances of the device according to the invention, FIG. 6 shows a few experimental measurements in which the rotation of the output light vector is plotted as abscissae and expressed in degrees as a function of the single-pass Faraday rotation expressed in degrees and plotted as ordinates, in respect of various anisotropies plotted as a function of the angle of inclination of a plate as expressed in degrees with respect to the axis of the resonator.

Figure 7:
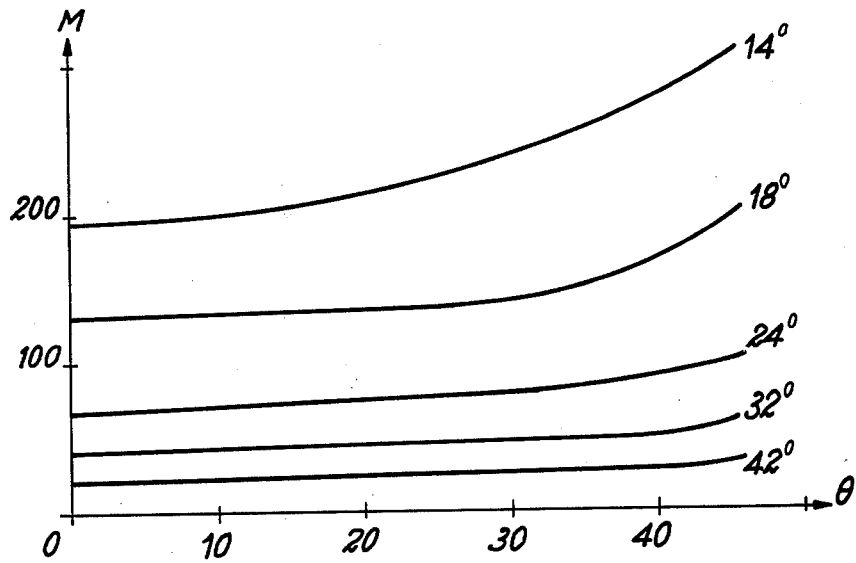
FIG. 7 is a plot of the static multiplying power as a function of the rotation of the output polarization in the case of different values of anisotropy.

These curves make it possible to determine the multiplication factor M defined by $\theta = M\mu$ between the Faraday rotation $\mu$ introduced into the resonator and the angle $\theta$ of rotation of the direction of polarization. This multiplying power is represented in FIG. 7 as ordinates as a function of the rotation of the output vector which is plotted as abscissae and expressed in degrees, in the case of different values of anisotropy expressed by the angle of inclination of the plate with respect to the axis of the resonator.

It is also possible to define a dynamic multiplying power related to the slope of the curves of FIG. 6. More precisely, the dynamic multiplying power M' is defined by the relation:

$$M' = d\theta/d\mu$$

Figure 8:
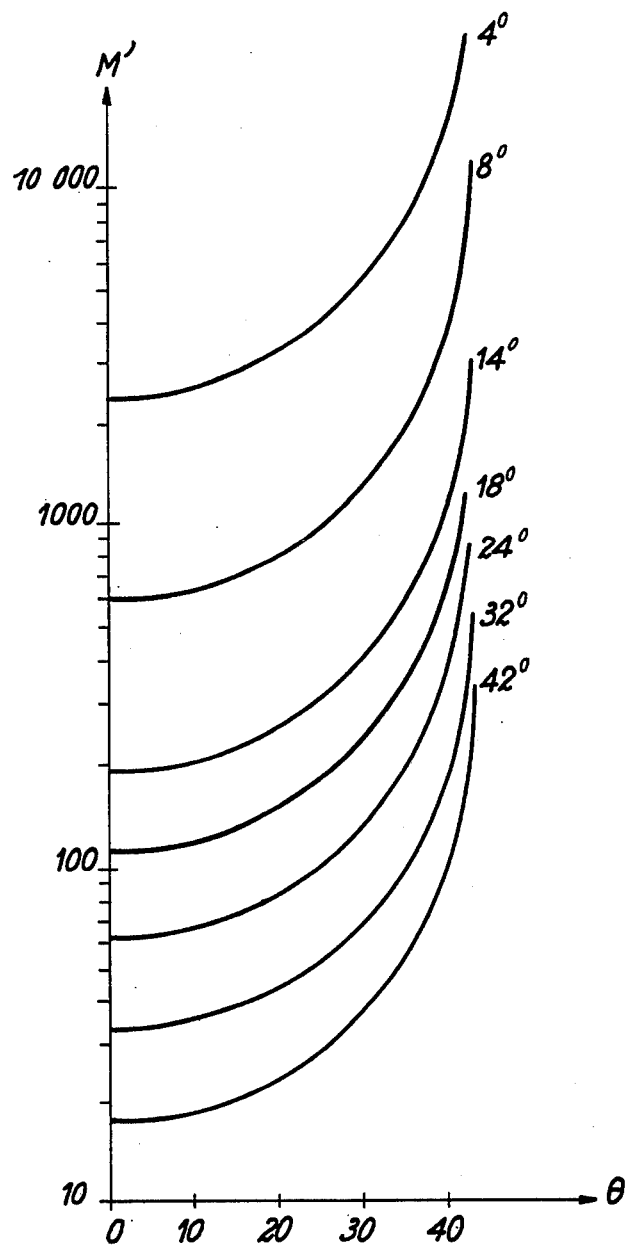
FIG. 8 is a plot of the dynamic multiplying power as a function of the rotation of the output polarization in the case of different values of anisotropy.

This dynamic multiplying power plays a part when a modulation is employed by means of an alternating-field component in order to control the frequency. The multiplying power M' is represented in FIG. 8 as a function of the rotation of the output vector expressed in degrees and plotted as abscissae, the value of anisotropy being always taken as a parameter.

Figure 9:
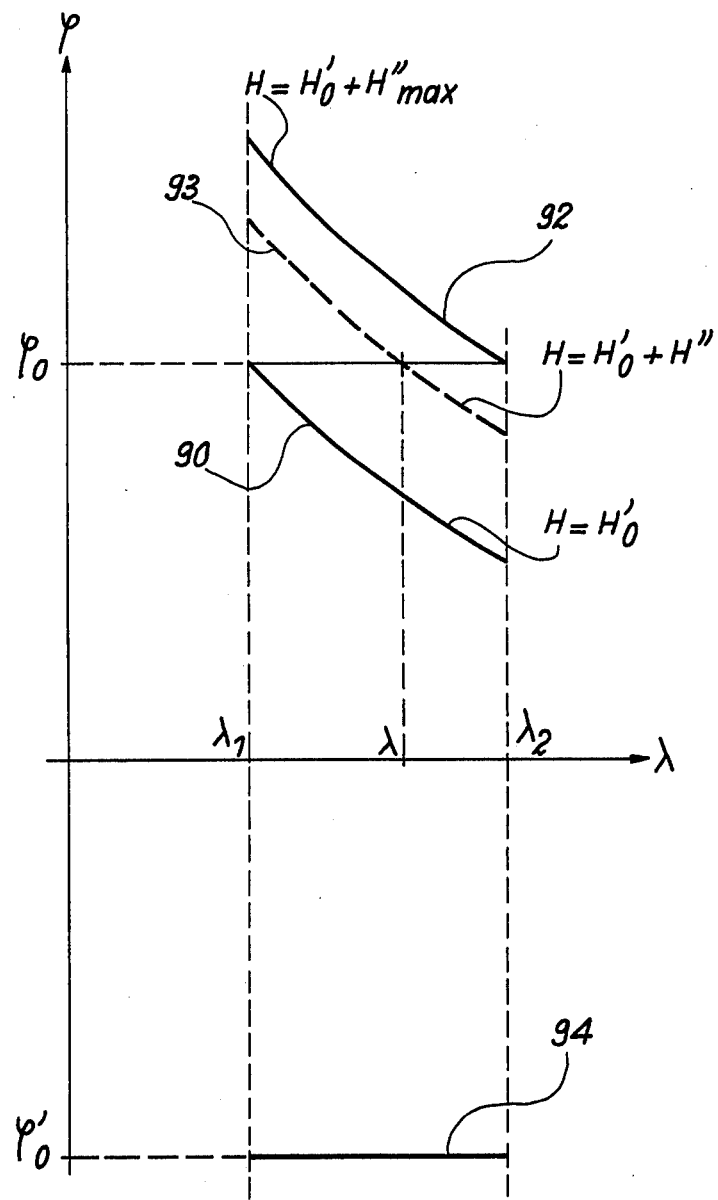
FIG. 9 represents the variations in the Faraday rotation as a function of the wavelength of the laser radiation in respect of several values of the applied magnetic field and in the case of two different rotators, one of which has a very low frequency dispersion with respect to the other.

There is shown in FIG. 9 the angle $\mu$ of the Faraday rotation as a function of the wavelength $\lambda$ of the radiation, the magnetic field H applied to the Faraday rotator being taken as parameter. In the case of a given position of the output analyzer or in other words in the case of a given rotation $\theta_0$ of the output vector $d$ and therefore in the case of a given Faraday rotation $\mu_0$, the range in which it is possible to tune the wavelength of the radiation emitted by the laser is located between $\lambda_1$ and $\lambda_2$, these values being obtained in respect of applied magnetic field amplitudes which are respectively equal to $H'_0$ and $H'_0 + H''_{max}$. The two curves 90 and 92 correspond to the variations $\mu(\lambda)$ in the case of these two limiting values, any intermediate value $H'_0 + H''$ being such as to produce a curve 93 located between the curves 90 and 92. There is thus obtained a wavelength of any value $\lambda_0$ comprised between $\lambda_1$ and $\lambda_2$ by applying a magnetic field $H'_0 + H''$ such that the corresponding curve 93 intersects the line of abscissae $\lambda_0$ at a point $\mu_0$ of ordinates.

If the Faraday rotation $\mu_0$ is too great to be compensated by an anisotropy, it is possible to employ a second Faraday rotator which has a rotation $\mu'_0$ of opposite sign to $\mu_0$ and which consequently compensates for the rotation $\mu_0$. If it is desired to maintain correct dispersion as a function of the wavelength, a material having low or even negative dispersion should preferably be adopted as a second rotator. There is shown in FIG. 9 a curve 94 which illustrates the variation of the Faraday rotation of the second rotator as a function of the wavelength on the assumption that the dispersion was zero in the case of this second rotator. The use of said second rotator whose action is in opposition to that of the first has the effect of bringing the curves 90 and 92 into the zone of small rotations in which they can always be compensated by the anisotropy without thereby attenuating the frequency sensitivity.

Figure 10:
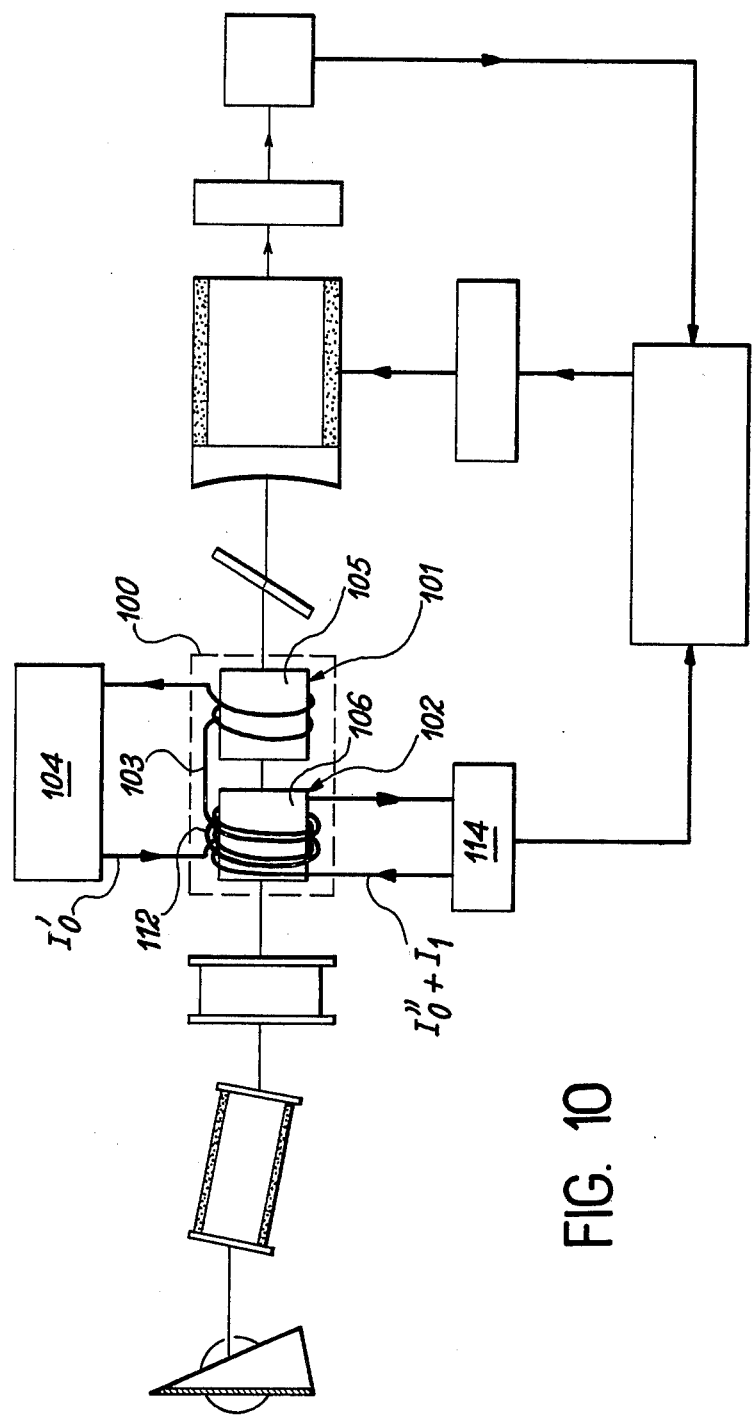
FIG. 10 illustrates a dye laser for applying the differential method which arises from the diagram of FIG. 9.

This differential method is illustrated in FIG. 10, there being again shown a dye laser which is similar to that of FIG. 4 but in which the Faraday rotator 100 comprises two rotators 101 and 102. The rotator 101 is composed of a material 105 placed within a first solenoid 103 supplied from a generator 104 which delivers direct current having an intensity $I'_0$. The second rotator 102 is constituted by a second material 106 placed within the solenoid 103 and within a second solenoid 112 supplied from a source 114 which comprises a direct-current source of intensity $I''_0$ and an alternating-current source of amplitude $I_1$. The materials 105 and 106 are such that the frequency dispersion of the Verdet constant of the material 106 is considerably greater than that of the material 105. The directions of the windings 103, 112 are such that the Faraday rotations at the points of traversal through the materials 105 and 106 are of opposite direction, the rotation within one of the rotators being thus counterbalanced by the rotation within the other rotator.

In order to explain the characteristics of this differential assembly with a greater degree of precision, a few examples of construction and of performances obtained will now be given.

By making use of a glass designated SFS6 under the trade name of Schott having a length of 5 cm, a field $H'_0$ of 2000 Gauss, a frequency range $\lambda_1 - \lambda_2$ of 100 A, there is obtained an imprecision in the frequency of the order of $\Delta\nu = 20$ Mc/s or, expressed in wavelength, $\Delta\lambda = 2 \times 10^{-4}$ A. By way of example, the crystal 105 can in this case be a NdLa doped borate glass for operation in the vicinity of 5800 A.

By making use of a crystal consisting of a Tb ALG garnet (see for example the article by Rubinstein published in the *Journal of Applied Physics*, 35, 1964, page 2338) having a length of 2 cm and a field $H''_0$ of 1200 gauss and in the case of a frequency range $\lambda_1 - \lambda_2$ of 100 A, there is obtained an imprecision in the frequency which is equal approximately $\Delta\nu = 1$ Mc/s, namely $\Delta\lambda = 10^{-6}$ A.

Finally, in the case of a sodium-vapor Faraday rotator and when $\lambda_1 - \lambda_2 = 1$ A in the vicinity of 5888 A, it is possible to have a Faraday dispersion of 100°, namely a deviation $\Delta\nu$ of 1000 c/s, which corresponds to $\Delta\lambda \simeq 10^{-8}$ A.

By means of this differential method, it is possible in each case to establish a wavelength calibration curve as a function of the applied field $H''_0$.

Throughout the foregoing description, the examples are drawn from the field of dry lasers. It remains apparent, however, that the invention applies to lasers of other types such as the gas lasers, for example, in particular to the helium-neon lasers which emit in the line at 3.39 $\mu$ and have a considerable gain, thus permitting the introduction into the cavity of elements such as the Faraday rotator and the tilted plate (a Faraday rotation as small as $2 \times 10^{-6}$ degree has been measured in the line at 3.39 $\mu$ with YIG crystal).

It is also wholly apparent that the introduction of an anisotropy is not limited to the use of a tilted plate but can also be carried out by any suitable means which can comprise anisotropically treated plates, anisotropic mirrors and the like.

All the foregoing explanations relate to a method and to a device in which the means for producing the first and the second rotation are placed within the laser resonator or similarly in which the amplifying medium is placed in the resonator in order to create a wavelength-selective phenomenon. In other words, the two resonators which serve in one case to produce the laser oscillation and in the other case to produce frequency stabilization are combined in single unit. In point of fact, the explanations given above have served to demonstrate that the amplifying medium does not perform a frequency-selecting function but merely amplifies the radiation which passes through it without modifying the direction of said radiation. In the diagram of FIG. 2, the vectors representing the field at the points $d$ and $e$, that is to say before and after traversal of the amplifying medium, are colinear. In consequence, the amplification function can very readily be separated from the frequency-selection function without thereby departing from the scope of the invention by placing the amplifying medium outside the resonator in which the frequency discrimination takes place.

This arrangement is shown in the left-hand portion of FIG. 3 in the case of the elements depicted in chain-dotted lines and representing the oscillating laser whose radiation is frequency-stabilized by the elements placed within a second resonator 24–26 which has become passive. In this alternative embodiment, the oscillating laser therefore comprises a first resonator constituted by the mirrors 27 and 29 in which is placed the amplifying medium 22′ and the mode selector 28′. The stimulated radiation 31 passes into a second passive resonator constituted by the two mirrors 24 and 26 between which are placed the Faraday rotator 30, the system 36 which provides anisotropic losses, the means 38 for extracting a part of the radiation contained in said second resonator. The discrimination means are the same as in the first alternative embodiment but the modification of the radiation frequency is clearly carried out by producing action on the first resonator, for example by modifying the position of the mirror 29 instead of the position of the mirror 24.

We claim:

1. A method of frequency-stabilization of the stimulated radiation emitted by a laser constituted by an amplifying medium placed within a resonator formed by two mirrors in which a mode selector is operated for selecting a single mode from all the longitudinal modes which are capable of oscillating, wherein:
    said radiation is subjected within the resonator to a first rotation of its direction of polarization by placing within the resonator a material which exhibits the magnetic rotatory polarization phenomenon and by applying a magnetic field thereto,
    anisotropic losses are introduced into the rotator and a second rotation of the direction of polarization of said radiation is thus caused to appear,
    part of the radiation contained in the resonator is extracted therefrom at any predetermined point,
    the direction D of polarization of said extracted radiation is measured,
    said direction D is controlled in dependence on a reference direction $D_0$ by measuring the difference between the directions D and $D_0$ and reducing said difference to zero by modifying the value of the resonant frequency of the resonator.

2. A method according to claim 1 wherein, in order to control the direction D of polarization in dependence on said reference direction $D_0$, the amplitude of the extracted radiation component at right angles to $D_0$ is detected and said component is adjusted to zero.

3. A method according to claim 2, wherein said applied magnetic field is a constant magnetic field on which an alternating magnetic field is superimposed and wherein the detection performed is synchronous with said alternating field of the component which is perpendicular to $D_0$.

4. A method according to claim 1, wherein said first rotation is composed of two rotations in opposite directions and one rotation exhibits a frequency dispersion of small magnitude with respect to the other.

5. A method according to claim 1, wherein the value of the stabilized frequency is adjusted by modifying the amplitude of the constant magnetic field applied to the material which is placed within the resonator.

6. A laser having frequency-stabilized radiation which serves to carry out the method according to claim 1 and is constituted by an amplifying medium placed within a resonator formed by two mirrors and a longitudinal mode selector which permits oscillation of only one longitudinal mode, wherein said laser comprises:
    a Faraday rotator placed on the axis of the resonator between the amplifying medium and any one of the mirrors and constituted by a material which exhibits the magnetic rotatory polarization phenomenon,
    means for applying a magnetic field to said material,
    an optical system which is placed within said resonator and exhibits anisotropic losses in respect of said radiation,
    means for extracting from the resonator a part of the radiation contained therein,
    means for measuring the direction D of polarization of said extracted radiation,
    means for controlling said direction D in dependence on a reference direction $D_0$ and constituted by a control loop comprising means for measuring the difference between the directions D and $D_0$, means for generating an error signal from the measurement of said difference, means for amplifying said error signal and means controlled by said amplified error signal for modifying the resonant frequency of the resonator.

7. A laser according to claim 6, wherein said optical system having anisotropic losses is constituted by at least one plate of transparent material having parallel faces and inclined to the axis of the resonator.

8. A laser according to claim 6, wherein the means for measuring the direction D of polarization of the radiation extracted from the cavity comprise an analyzer whose direction is displaced by 90° with respect to the reference direction $D_0$ and a photoelectric detector which receives the extracted radiation after said radiation has passed through said analyzer.

9. A laser according to claim 8, wherein the means for producing a magnetic field within the material of the Faraday rotator comprise a solenoid supplied by a first variable direct-current generator and by a second alternating-current generator and wherein the means for producing the error signal are constituted by a synchronous detector which receives the electrical signal delivered by the photodetector and an aternating-current reference signal derived from said second alternating-current generator.

10. A laser according to claim 9, wherein said Faraday rotator comprises:
    a first material having a first Faraday dispersion placed within a first solenoid supplied by a first generator for producing direct current of intensity $I'_0$, a second material has a Faraday dispersion of greater magnitude than the Faraday dispersion of said first material and which is placed within said first solenoid and within the second solenoid supplied by a second generator for producing direct current of intensity $I''_0$ and by a third generator for producing alternating current of intensity $I_1$, the directions of the currents $I'_0$ and $I''_0$ within said first and second solenoids being such that the resultant Faraday rotations take place in opposite directions.

11. A laser according to claim 6, wherein the material of the Faraday rotator is a vapor having an absorption line in the vicinity of the radiation frequency of the laser.

12. A laser according to claim 6, wherein the means for extracting from the resonator a part of the radiation contained therein are constituted by a plate having parallel faces which is placed within the resonator and inclined at an angle of a few degrees with respect to the axis of the resonator.

13. A laser according to claim 6, wherein the means for extracting from the resonator a part of the radiation contained therein are constituted by one of the mirrors of the resonator which is semi-transparent.

14. A laser according to claim 6, wherein the means for modifying the resonant frequency of the resonator are constituted by a piezoelectric support which is bonded to one of the mirrors of the cavity.

15. A laser according to claim 6, wherein said amplifying medium is a liquid dye solution excited by suitable means.

16. A method of frequency stabilization of the stimulated radiation emitted by a laser constituted by an amplifying medium placed within a first resonator formed by two mirrors and in which a mode selector is operated so as to select a single mode from all the longitudinal modes which are capable of oscillating, wherein:

the stimulated radiation is caused to pass into a second resonator, said radiation is subjected within said second resonator to a first rotation of its direction of polarization by placing within said second resonator a material which exhibits the magnetic rotatory polarization phenomenon and by applying a magnetic field thereto, anisotropic losses are introduced into said second resonator and a second rotation of the direction of polarization of said radiation is thus caused to appear, part of the radiation contained in said second resonator is extracted therefrom at any predetermined point, the direction D of polarization of said extracted radiation is measured, said direction D is controlled in dependence on a reference direction $D_0$ by measuring the difference between the directions D and $D_0$ and reducing said difference to zero by modifying the value of the resonant frequency of said first resonator.

17. A laser having frequency-stabilized radiation and constituted by an amplifying medium placed within a first resonator formed by two mirrors and a longitudinal mode selector which permits oscillation of only one longitudinal mode and further comprises externally of said first resonator:

a second resonator traversed by the radiation issuing from said first resonator, a Faraday rotator placed within the interior and on the axis of said second resonator and constituted by a material which exhibits the magnetic rotatory polarization phenomenon, means for applying a magnetic field to said material, an optical system which is placed within said second resonator and exhibits anisotropic losses in respect of said radiation, means for extracting from said second resonator a part of the radiation contained therein, means for measuring the direction D of polarization of said extracted radiation, means for controlling said direction D in dependence on a reference direction $D_0$ and constitued by a control loop comprising means for measuring the difference between the directions D and $D_0$, means for generating an error signal from the measurement of said difference, means for amplifying said error signal and means controlled by said amplified error signal for modifying the resonant frequency of said first resonator.

18. A laser according to claim 17, wherein said optical system having anisotropic losses is constituted by at least one plate of transparent material having parallel faces and inclined to the axis of the resonator.

* * * * *